(12) United States Patent
Deivasigamani et al.

(10) Patent No.: US 11,519,675 B1
(45) Date of Patent: Dec. 6, 2022

(54) HEATING SYSTEM

(71) Applicant: Intellihot, Inc., Galesburg, IL (US)

(72) Inventors: Sridhar Deivasigamani, Peoria, IL (US); Sivaprasad Akasam, Dunlap, IL (US)

(73) Assignee: Intellihot, Inc., Galesburg, IL (US)

( * ) Notice: Subject to any disclaimer, the term of this patent is extended or adjusted under 35 U.S.C. 154(b) by 0 days.

(21) Appl. No.: 17/474,402

(22) Filed: Sep. 14, 2021

(51) Int. Cl.
  *F28D 20/02* (2006.01)
  *F28D 20/00* (2006.01)
  *F24H 4/04* (2006.01)

(52) U.S. Cl.
  CPC ........... *F28D 20/0056* (2013.01); *F24H 4/04* (2013.01); *F28D 20/0034* (2013.01); *F28D 20/023* (2013.01); *F28D 2020/0008* (2013.01); *F28D 2020/0069* (2013.01); *F28D 2020/0078* (2013.01)

(58) Field of Classification Search
  CPC .......... F28D 20/02; F28D 20/023; F24H 4/02; F24H 4/04; F24D 11/0214
  See application file for complete search history.

(56) References Cited

FOREIGN PATENT DOCUMENTS

| CH | 632080 A | * | 9/1982 | .......... F24D 11/0214 |
| CN | 109812858 A | * | 5/2019 | |
| EP | 0044998 A1 | * | 2/1982 | |
| WO | WO-2021005735 A1 | * | 1/2021 | |

\* cited by examiner

*Primary Examiner* — Eric S Ruppert
(74) *Attorney, Agent, or Firm* — Tracy Jong Law Firm; Tracy P. Jong; Cheng Ning Jong

(57) ABSTRACT

A heating system including a heat pump; a thermal battery loop including a thermal battery and a pump configured to circulate a working fluid through the thermal battery; a fluid conductor for receiving the first fluid at an inlet at a first temperature and delivering the first fluid at a second temperature; a first heat exchanger configured to thermally couple the heat pump and the fluid conductor at a first location of the fluid conductor; a second heat exchanger configured to thermally couple the thermal battery loop and the heat pump; and a third heat exchanger configured to thermally couple the thermal battery and the fluid conductor at a second location of the fluid conductor, wherein the second location of the fluid conductor is a location downstream from the first location of the fluid conductor between the inlet and the outlet of the fluid conductor.

20 Claims, 10 Drawing Sheets

HEATING SYSTEM

BACKGROUND OF THE INVENTION

1. The Field of the Invention

The present invention relates to a heating system having its heating inputs fluidly isolated from its hot water delivery system. More specifically, the present invention is directed to a heat pump-based heating and heat energy storage system capable of heating and storing excess heat energy simultaneously where the heat pump and the heat energy storage system are fluidly isolated from its hot water delivery system.

2. Background Art

Various fossil fuel phase-out initiatives have been made in the heating industry and mandates have been increasingly devised and implemented to phase out the direct or indirect use of fossil fuel in heat production for domestic and/or industrial uses. Attempts have been made to heat domestic water with alternative means, e.g., with the use of heat pumps having operations that are primarily driven using electricity in the form of pump or compressor operations. Supplemental electric heating elements may also be employed to aid fossil fuel-free domestic water heating systems in meeting heating demands. However, the need to meet heating demands have driven designers to return to tanked solutions which bring back the disadvantages associated with such solutions, one of the disadvantages being the exposure of stagnant domestic water disposed at temperature ranges suitable for *Legionella* proliferation when hot water demands are small, over extended periods. Two examples of tanked solutions are included herein where domestic hot water is supplied directly from a tank in each of these examples:

U.S. Pat. Pub. No. 20190128565 of Pugh et al. (hereinafter Pugh) discloses a heat pump water heater having a tank, a heat source and a heat pump system. The heat pump system has a refrigerant path, at least a portion of which is in thermal communication with the water tank volume such that heat transfers from a refrigerant to the water tank volume. A fan causes air to flow through a housing, and another portion of the refrigerant path includes an evaporator in the housing. The fan is within the housing and may further be within a second housing. The first housing may include a baffle to direct air flow. The fan may be a variable speed fan in communication with a controller, so that the controller controls the fan speed depending on a temperature of the refrigerant.

U.S. Pat. Pub. No. 20100209084 of Nelson et al. (hereinafter Nelson) discloses a heat pump water heater and systems and methods for its control. The systems are configured to heat water within a water storage tank of a heat pump water heater wherein a controller within the system is operatively connected to a plurality of heat sources including at least one electric heating element and a heat pump and sensors in order to selectively energize one of the plurality of heat sources. The controller is configured to process data representative of the temperature of water within the tank near the top of the water storage tank, and rate of water flowing out of the water storage tank, in order to automatically selectively energize the heat sources. The selection of heat sources by the controller is determined by a mode of operation selected by the user and the data processed by the controller in view of the selected mode of operation.

Each of Pugh and Nelson discloses the use of a large thermal storage tank that accommodates demands of hot water. As each of Pugh and Nelson's tanks holds a significant amount of water to anticipate demands, there is no guaranty that all portions of the heated water in the tank will exit the tank and be replaced with fresh cold or unheated water. If insufficiently used and the water held in the tank is not consumed or replaced over a long period of time, *Legionella* can proliferate and the next user/s can be exposed to a heightened level of *Legionella* risk.

There exists a need for a heating system that is not reliant on fossil fuel and one which is not exposed to the same *Legionella* risks plaguing tanked domestic water heating systems and an integrated heat pump and heat energy storage-equipped heating system that fully takes advantage of the thermal couplings between a heat pump, a thermal storage system and a fluid conductor for delivering hot water.

SUMMARY OF THE INVENTION

In accordance with the present invention, there is provided a heating system for heating a first fluid, the heating system including:
(a) a heat pump;
(b) a thermal battery loop including a thermal battery and a pump configured to circulate a working fluid through the thermal battery, wherein the thermal battery loop is configured to be turned on by turning on the pump;
(c) a fluid conductor for receiving the first fluid at an inlet at a first temperature and delivering the first fluid at a second temperature;
(d) a first heat exchanger configured to thermally couple the heat pump and the fluid conductor at a first location of the fluid conductor, wherein the first location of the fluid conductor is disposed between the inlet and the outlet of the fluid conductor;
(e) a second heat exchanger configured to thermally couple the thermal battery loop and the heat pump; and
(f) a third heat exchanger configured to thermally couple the thermal battery and the fluid conductor at a second location of the fluid conductor, wherein the second location of the fluid conductor is a location downstream from the first location of the fluid conductor between the inlet and the outlet of the fluid conductor,
wherein a thermal charging command causes the heat pump and the thermal battery loop to turn on to cause heat transfer from the heat pump to the thermal battery loop via the second heat exchanger, a heating command causes at least one of the heat pump and the thermal battery loop to turn on to cause heat transfer from at least one of the heat pump via the first heat exchanger and the thermal battery loop via the third heat exchanger to the first fluid of the fluid conductor and a simultaneous thermal charging and heating command causes the heat pump and the thermal battery loop to turn on. In one embodiment, the thermal battery includes more than one heat storage capsule each including a phase change material. In one embodiment, the more than one heat storage capsule include phase change materials of more than one melting point. In one embodiment, the thermal battery includes more than one compartment each compartment configured to hold a heat storage material of a distinct melting point. In one embodiment, the thermal battery includes a pillow plate heat exchanger. In one embodiment, the thermal battery includes phase change materials of least two distinct melting points. In one embodiment, the thermal battery includes a first phase change material of a first melting point and a second phase change material of a second melting point, wherein the first melting point is not the same as the second melting point and a ratio of the first phase change material to the second phase change material is not 1.0 by quantity selected from the group consisting of volume, weight and a combination thereof. In one embodiment, at least one of the first heat exchanger, second heat exchanger and third heat exchanger is a plate-type heat exchanger.

An object of the present invention is to provide a heating system capable of storing surplus thermal energy to meet or supplement a heating requirement at a later time, lessening the heating load when it is required.

Another object of the present invention is to provide a heating system capable of storing surplus thermal energy while meeting a heating requirement.

Another object of the present invention is to provide a heating system capable of meeting a hot water demand quickly without having to store a pre-heated volume of potable water. The energy for meeting the demand quickly is stored in a thermal battery disposed in a circuit completely fluidly isolated from the hot water demand.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2— heating system
4—thermal battery loop
6—thermal battery
8—fluid conductor
10—inlet of fluid conductor
12—outlet of fluid conductor
14—heat pump
16—first heat exchanger
18—second heat exchanger
20—third heat exchanger
22—pump
24— compressor
26—expansion valve
28—evaporator
30—blower
32— vent
34—encapsulated phase change material (PCM) or capsule
36—encapsulated PCM
38—encapsulated PCM
40— section or compartment
42—section or compartment
44—section or compartment
46—working fluid
48—divider
50— slot
52—perimeter
54— perimeter
56—perimeter
58— perimeter
60—inlet to thermal battery
62—insulation
64—shell
66— phase change material (PCM)
68— welded seam
70— PCM
72— PCM
74— PCM
76—first plate
78—second plate
80—plane
82— welded spot
84— space between two consecutive pillow plate heat exchangers
86—controller
88— central axis of thermal battery

PARTICULAR ADVANTAGES OF THE INVENTION

The present heating system is useful for storing thermal energy when a heating power requirement of the heating system is disposed at or below the heating level the heat pump can provide. Stored thermal energy can be used to reduce the heating load of a heater when the heat pump is unavailable.

The present heating system includes a thermal battery to store energy as latent heat stored therein allows for an 80% smaller volume for an equivalent amount of hot water capacity. Further, by not storing potable water, *Legionella* risk is mitigated, effectively allowing for a lower targeted phase change transition temperature as heat transfer occurs to a smaller volume of water only when it is needed. Substantially smaller storage volume and lower temperatures combine to significantly reduce standby losses or load shifting capability. A hot water demand is met by heat harnessed using a heat pump and/or heat stored in a thermal battery. As the heat pump and thermal battery loop are not fluidly connected to the fluid conductor useful for providing hot water, any risk of leakage of a phase change material into the requested hot water is eliminated.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
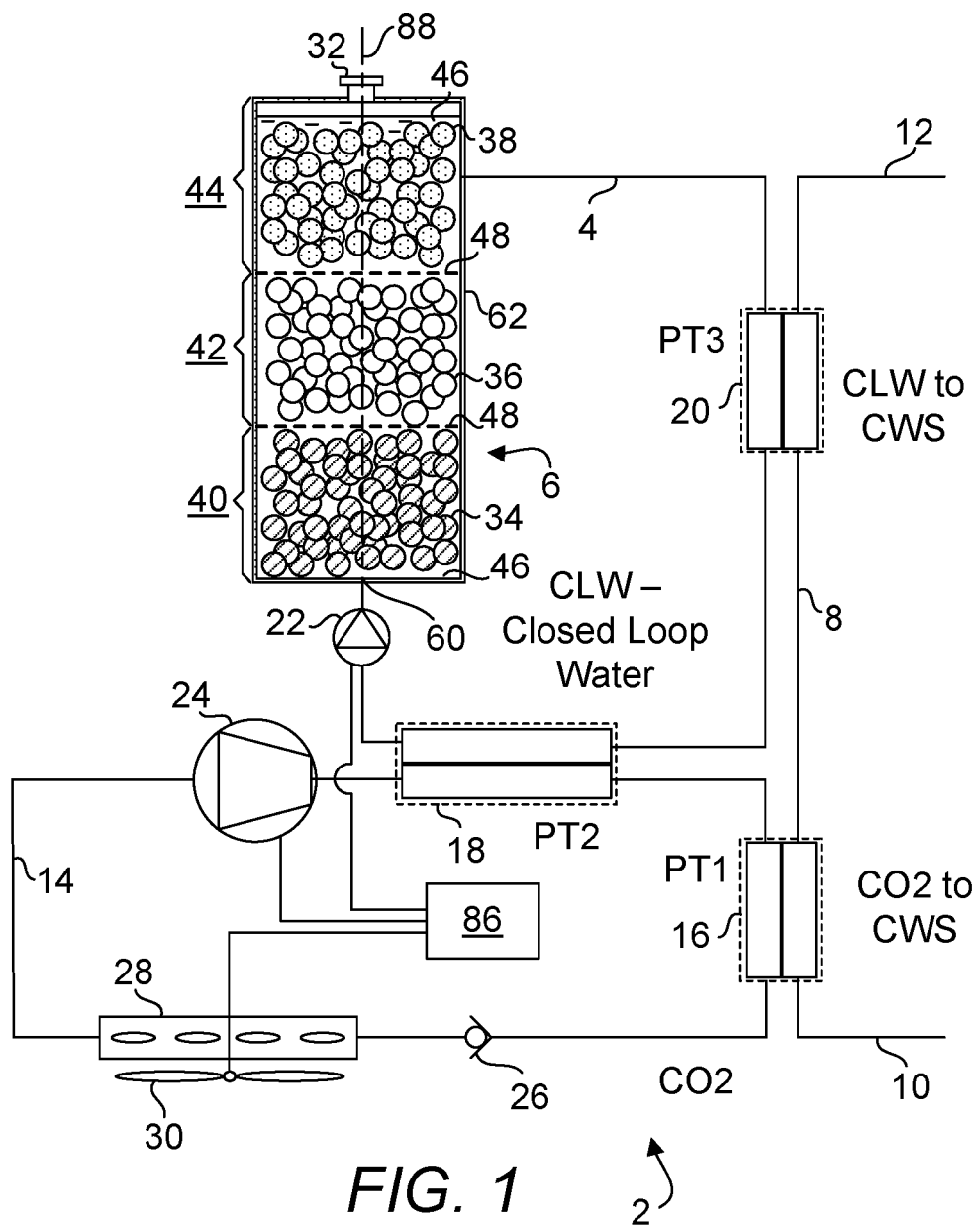
FIG. 1 is a diagram depicting a present heating system.

FIG. 1 is a diagram depicting a present heating system 2 useful for heating a first fluid, the heating system 2 including a heat pump 14, a thermal battery loop 4, a fluid conductor 8, a first heat exchanger 16, a second heat exchanger 18 and a third heat exchanger 20. The thermal battery loop 4 includes a thermal battery 6 and a pump 22 configured to circulate a working fluid 46 through the thermal battery 6, wherein the thermal battery loop 4 is configured to be turned on by turning on the pump 22. The fluid conductor 8 is useful for receiving the first fluid at an inlet at a first temperature and delivering the first fluid at a second temperature. The first heat exchanger 16 is configured to thermally couple the heat pump 14 and the fluid conductor 8 at a first location of the fluid conductor 8, wherein the first location of the fluid conductor 8 is disposed between the inlet and the outlet of the fluid conductor 8. The second heat exchanger 18 is configured to thermally couple the thermal battery loop 4 and the heat pump 14. The third heat exchanger 20 is configured to thermally couple the thermal battery 6 and the fluid conductor 8 at a second location of the fluid conductor 8, wherein the second location of the fluid conductor 8 is a location downstream from the first location of the fluid conductor 8 between the inlet 10 and the outlet 12 of the fluid conductor 8. In one embodiment, at least one of the first heat exchanger, second heat exchanger and third heat exchanger is a plate-type heat exchanger for a compact configuration of the heat exchanger.

The heat pump 14 includes a compressor 24 fluidly connected to an expansion valve 26, an evaporator 28, an expansion valve 26. The evaporator 28 is functionally coupled to a blower 30. The compressor 24 is useful for circulating a refrigerant in the heat pump fluid conductor through the evaporator 28 where the refrigerant flowing therein expands by absorbing heat from the ambient environment of the evaporator 28. As the expansion valve 26 is disposed upstream of the evaporator 28, the refrigerant flowing therein expands upon passing the expansion valve 26 and before arriving at compressor 24 that adds energy to the refrigerant. As the refrigerant arrives at heat exchanger 18, the refrigerant condenses, giving up heat to the thermal battery loop 4. Further, as refrigerant arrives at heat exchanger 16, the refrigerant condenses, giving up heat to the fluid conductor 8 and any flow disposed therein.

A controller 86 is functionally connected to the compressor 24, the blower 30 and the pump 22. The control device 48 is operable to control the pump 10 to circulate the working fluid 46 in the thermal battery loop 4 and the compressor 24 to circulate the working fluid or refrigerant in the heat pump in response to a battery charging demand.

A heating command causes at least one of the heat pump 14 and the thermal battery loop 4 to turn on to cause heat transfer from at least one of the heat pump 14 via the first heat exchanger 16 and the thermal battery loop 4 via the third heat exchanger 20 to the first fluid of the fluid conductor 8. A simultaneous thermal charging and heating command causes the heat pump 14 and the thermal battery loop 4 to turn on.

Figure 5:
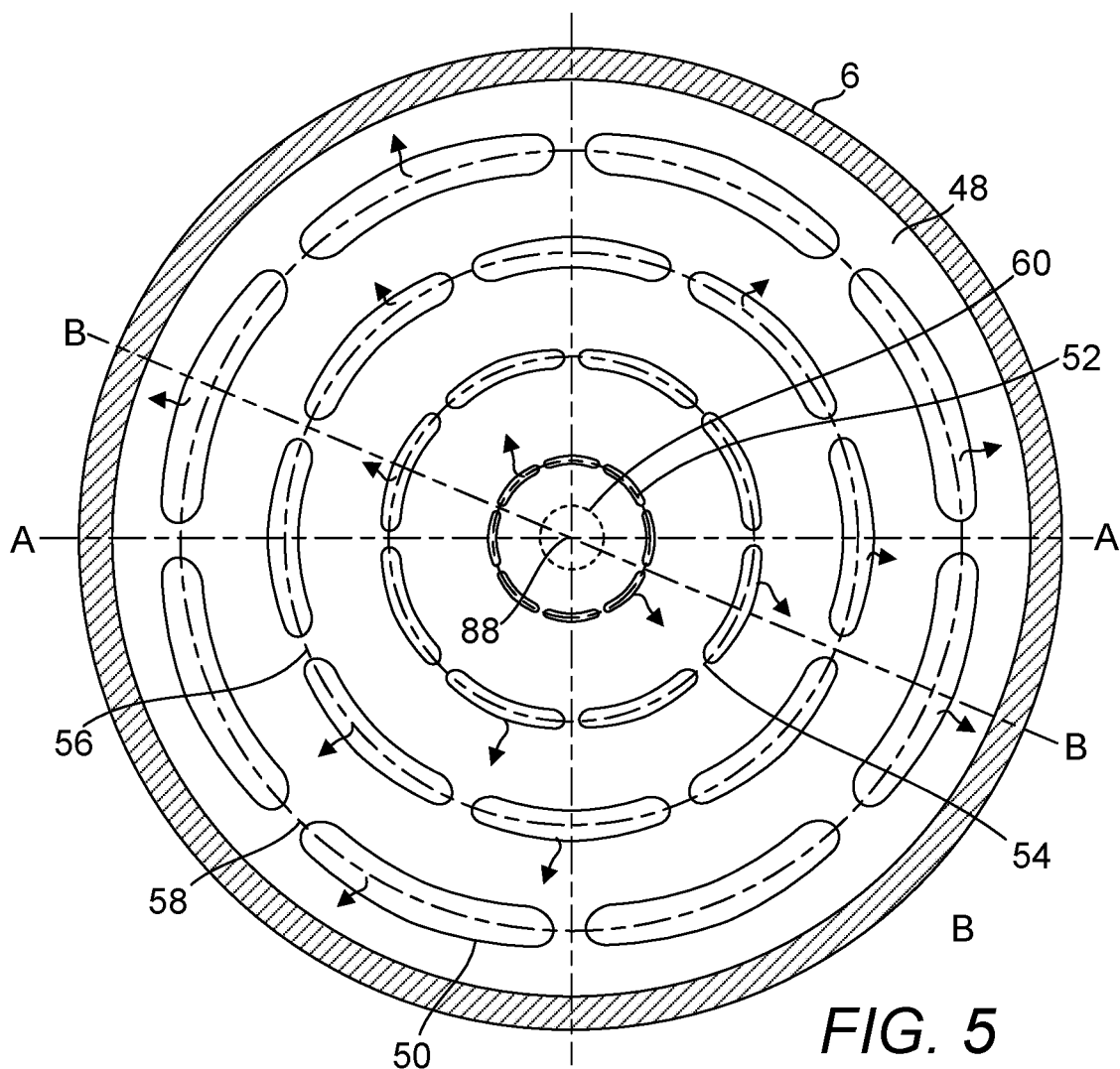
FIG. 5 is a plan view of a divider of a thermal battery and flows through the divider.
Figure 6:
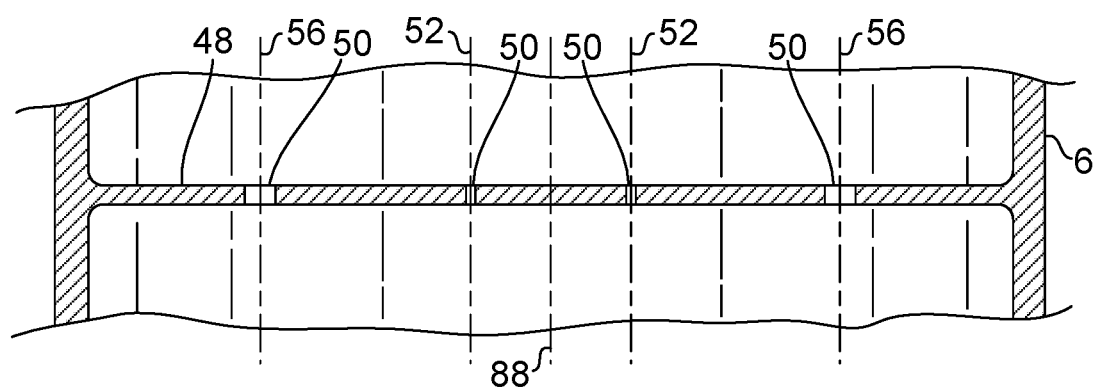
FIG. 6 is a partial cross-sectional view of a divider of a thermal battery of the present heating system as taken along line A-A of FIG. 5.
Figure 7:
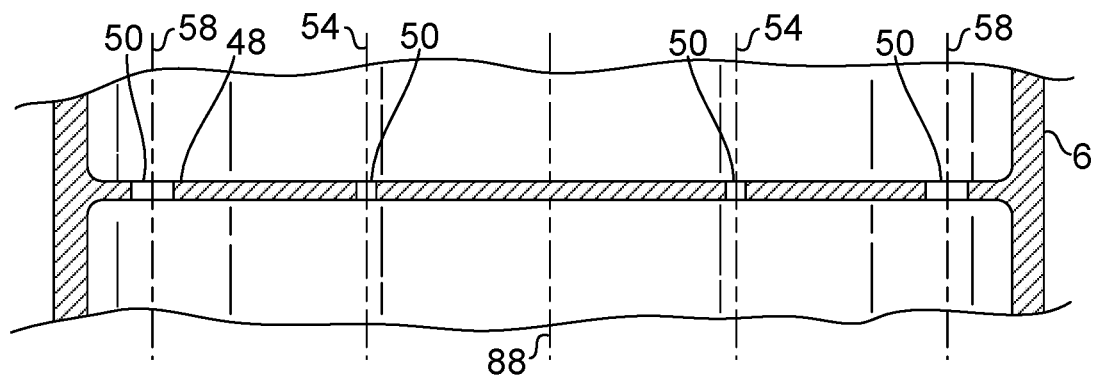
FIG. 7 is a partial cross-sectional view of a divider of a thermal battery of the present heating system as taken along line B-B of FIG. 5.

The thermal battery 6 includes a plurality of heat storage capsules 34 each including a phase change material (PCM). In use, the working fluid 46 carries energy obtained via the second heat exchanger 18 before being absorbed by the heat storage capsules 34, 36, 38. Although PCM of a uniform melting point may be used in the heat storage capsules 34, 36, 38, the heat storage capsules 34, 36, 38 may contain PCM of different melting points. For instance capsules 34 may contain PCM of a melting point higher than the PCM contained in capsules 36 and capsules 36 may contain PCM of a melting point higher than the PCM contained in capsules 38. However, to realize the benefit of PCM of various melting points, it is important for capsules of PCM of each melting point to be grouped together. Therefore, for capsules of PCM of three different melting points, three separate sections 40, 42, 44 are required. Each section is segregated from its adjacent section by a divider 48 so that only capsules 34 of PCM of the same melting point are group in each section. By using PCM of various melting points, an increased level of heat energy may be stored in the thermal battery 6. Although separated by dividers 48, the working fluid 46 is still required to flow through the sections 40, 42, 44. FIGS. 5-7 disclose details of the dividers 48 which allow such a flow to occur. All three sections are insulated with insulation 62 and receive the working fluid 46 via inlet 60. A vent 32 is provided to prevent excessive pressure from building up within the thermal battery 6 while allowing the working fluid 46 to flow freely into it without any effects of pressure differentials that restrict movements of the fluid into and out of the thermal battery 6.

Figure 2:
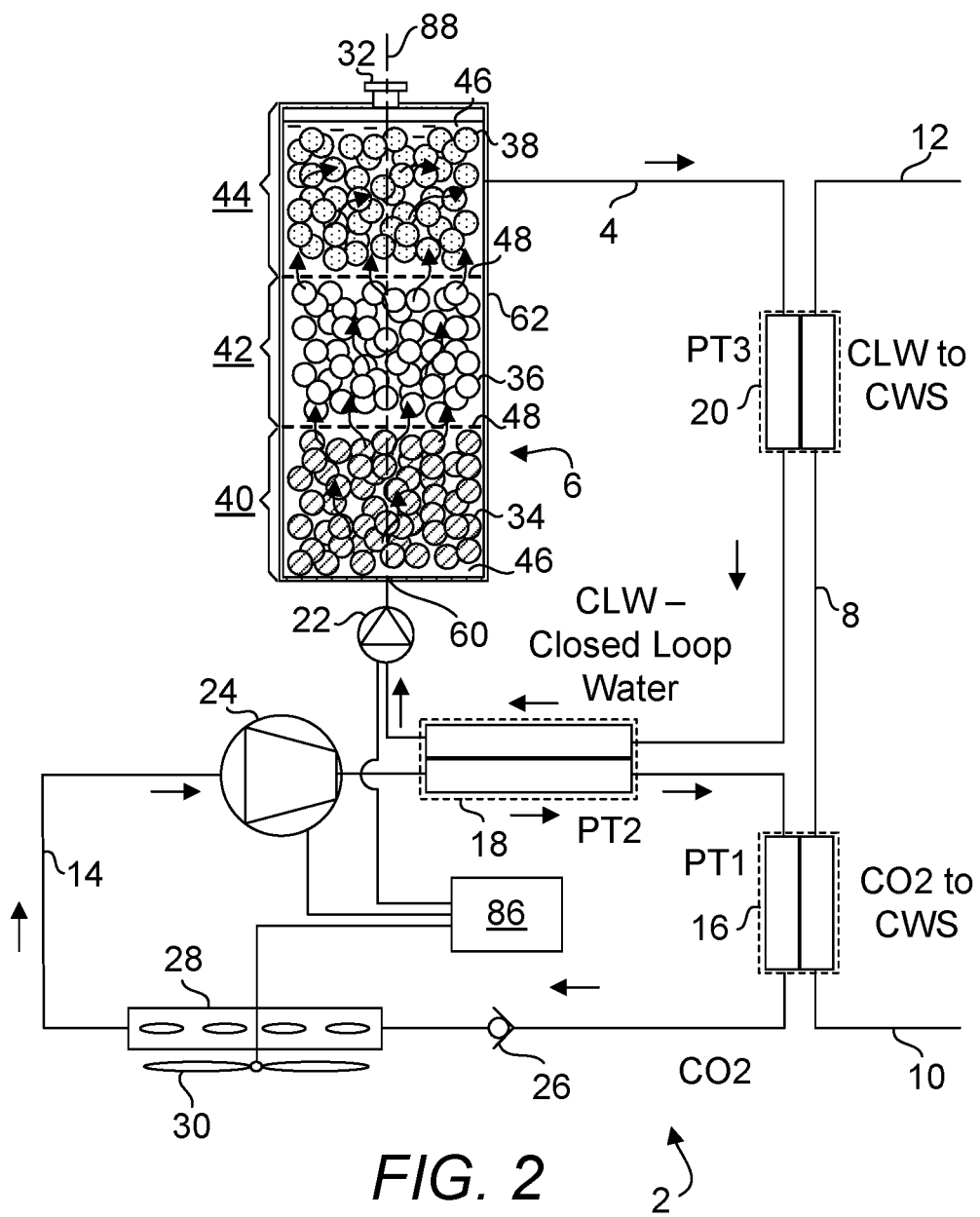
FIG. 2 is a diagram depicting a heat pump of the present heating system being used for charging a thermal battery of the present heating system.

FIG. 2 is a diagram depicting a heat pump of the present heating system being used for charging a thermal battery 6 of the present heating system 2. In FIG. 2, the arrows are used to show the direction of travel of the working fluids of the heat pump 14 and the thermal battery loop 4. A thermal charging command of the controller 86 causes the heat pump 14 and the thermal battery loop 4 to turn on to cause heat transfer from the heat pump 14 to the thermal battery loop 4 via the second heat exchanger 18.

Figure 3:
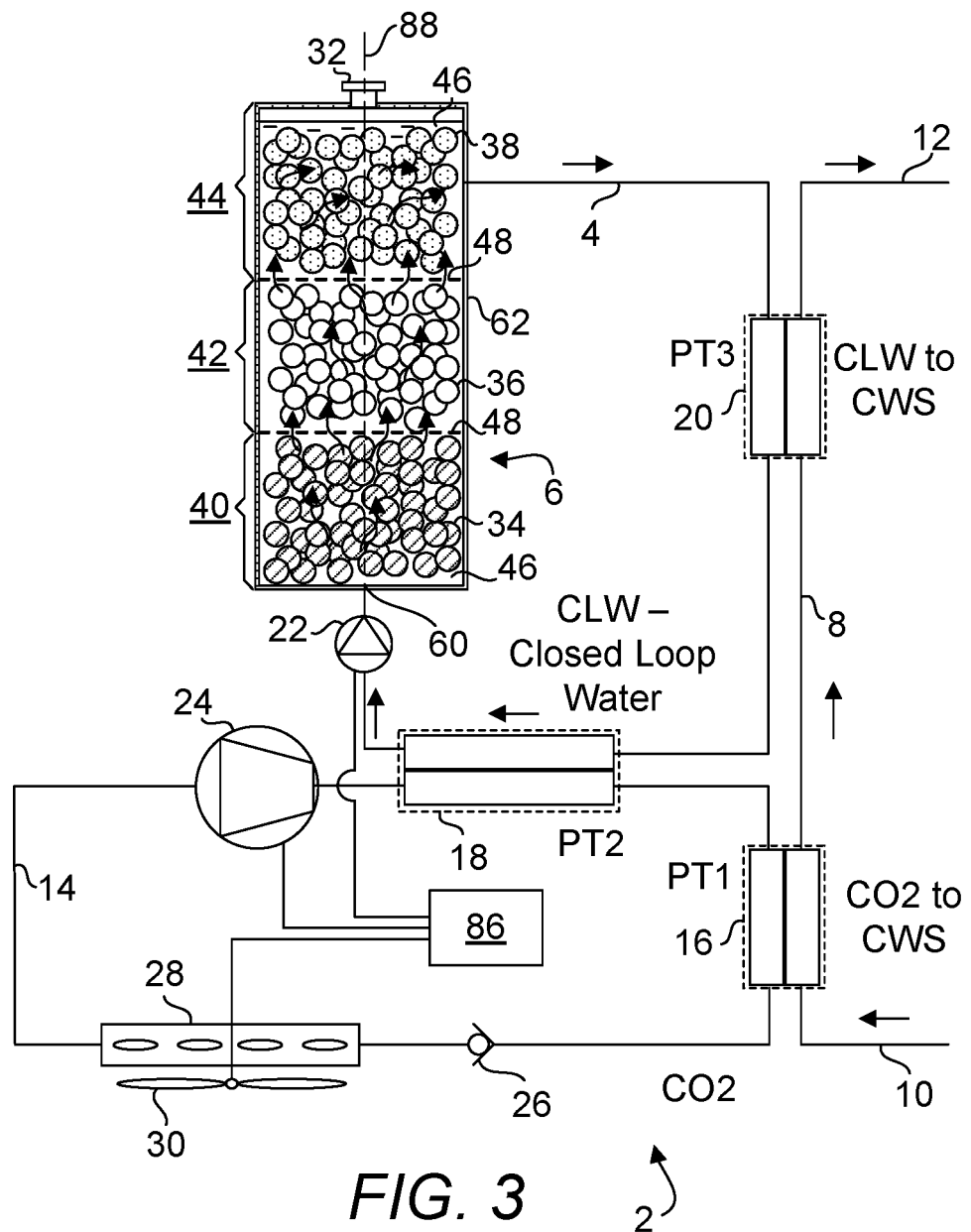
FIG. 3 is a diagram depicting using a thermal battery of the present heating system to supply hot water.

FIG. 3 is a diagram depicting using a thermal battery of the present heating system to supply hot water. In FIG. 3, the arrows are used to show the direction of travel of the working fluids of the heat pump 14 and a hot water request as shown in a flow in the fluid conductor 8. Here, as the thermal battery is determined by the control device 86 to be capable of supplying heating of the flow in the fluid conductor 8, only the thermal battery loop 4 is turned on to cause heat transfer from the thermal battery loop 4 to the flow of the fluid conductor 8 via the third heat exchanger 20.

Figure 4:
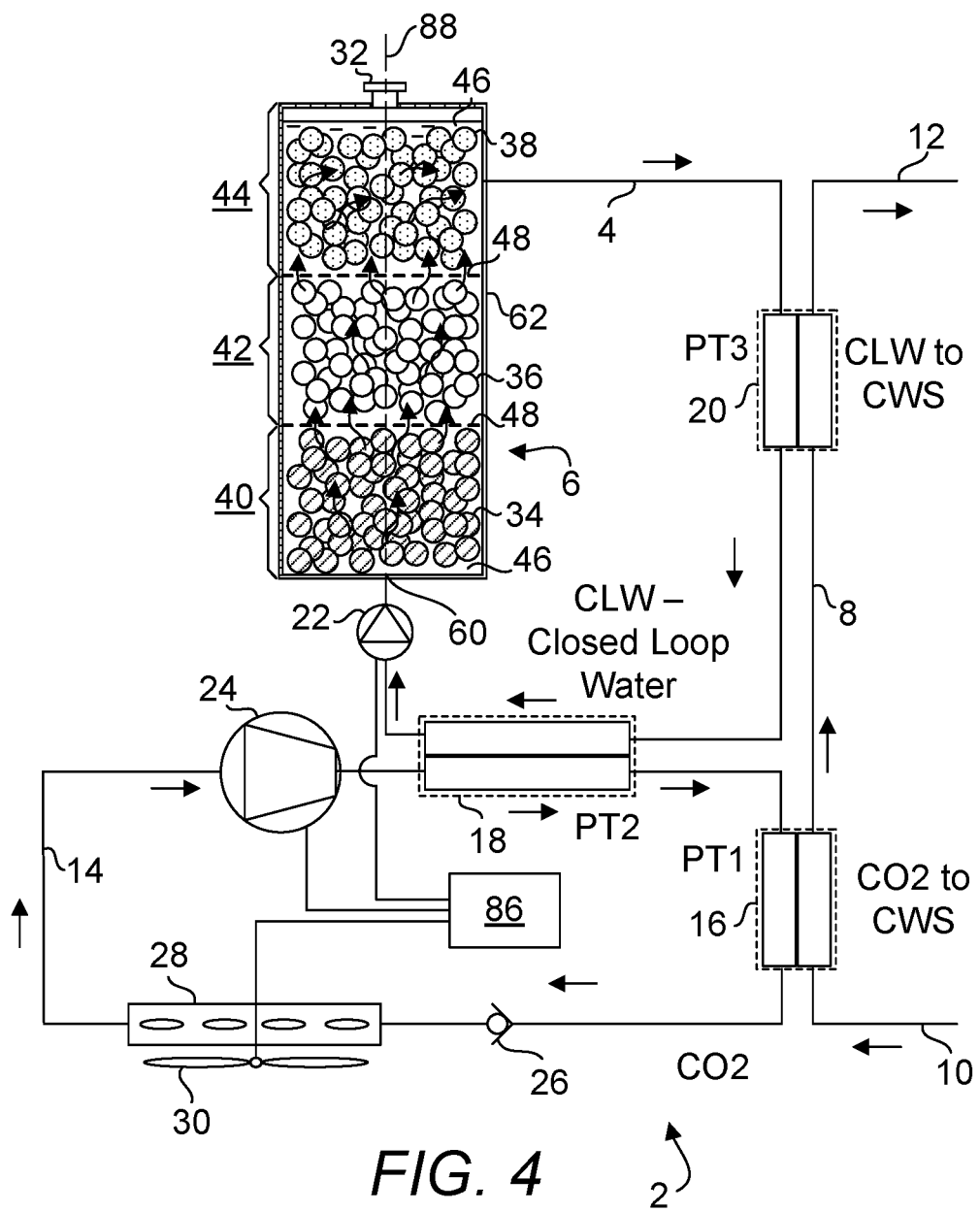
FIG. 4 is a diagram depicting using both a thermal battery and a heat pump of the present heating system to supply hot water.

FIG. 4 is a diagram depicting using both a thermal battery and a heat pump of the present heating system to supply hot water. In FIG. 4, the arrows are used to show the direction of travel of the working fluids of the heat pump 14 and thermal battery loop 4 and a flow due to a hot water request in the fluid conductor 8. A heating command causes the heat pump 14 and the thermal battery loop 4 to turn on to cause heat transfer from at least one of the heat pump 14 via the first heat exchanger 16 and the thermal battery loop 4 via the third heat exchanger 20 to the first fluid of the fluid conductor 8. Further, if heat energy can be stored in the thermal battery 6 faster than it can be used to heat the flow of the fluid conductor 8, the amount of heat energy stored in the thermal battery 6 will increase.

Figure 8:
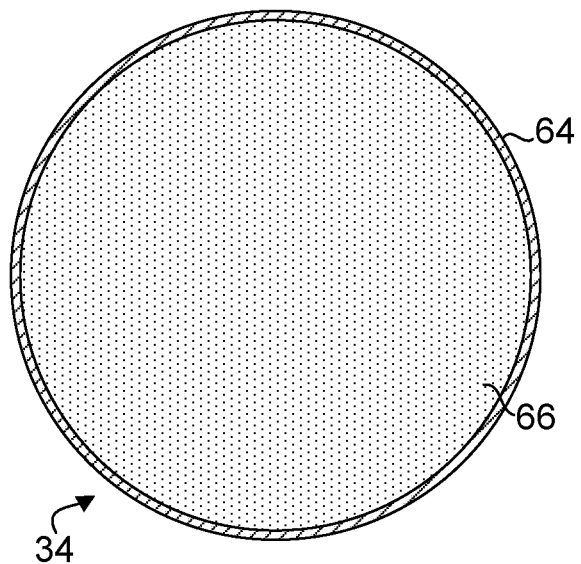
FIG. 8 is a cross-sectional view of an encapsulated phase change material (PCM) depicting PCM enclosed in a shell.

FIG. 5 is a plan view of a divider of a thermal battery and flows through the divider. FIG. 6 is a partial cross-sectional view of a divider 48 of a thermal battery 6 of the present heating system 2 as taken along line A-A of FIG. 5. FIG. 7 is a partial cross-sectional view of a divider 48 of a thermal battery 6 of the present heating system 2 as taken along line B-B of FIG. 5. Referring to FIG. 5, it shall be noted that a plurality of slots 50 are provided on each divider 48 to allow the working fluid 46 (see FIGS. 1-4) to traverse the thermal battery 6. The divider 48 is configured in a cylindrical shape to conform to the shape of the housing of the thermal battery 6. However, housings of any other shapes can work provided that dividers are still provided to segregate the encapsulated PCM of each distinct melting point into their own section or compartment. The slots 50 are preferably configured in increasing sizes as they are farther removed from the central axis 88 of the thermal battery 6. As a fluid tends to follow a path of the least resistance, an inlet 60 aligned with the central axis 88 tends to follow the shortest path to its outlet also aligned with the central axis 88, the use of slots of a smaller size causes a greater pressure drop to follow this path and encouraging the working fluid 46 to spread out from the central axis 88 towards slots disposed at perimeters 52, 54, 56, 58 more evenly, thereby surrounding most if not all of the encapsulated PCM to ensure that thermal transfer can occur more readily between the encapsulated PCM and the working fluid 46. FIG. 8 is a cross-sectional view of an encapsulated phase change material (PCM) depicting PCM 66 enclosed in a shell 64. In use, the PCM is therefore physically isolated from the working fluid 46 that surrounds it.

Figure 9:
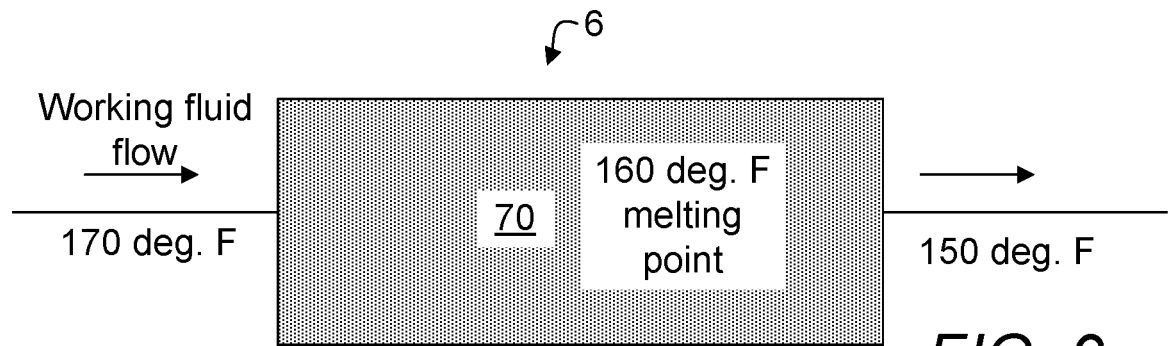
FIG. 9 is a diagram depicting a thermal battery with a single PCM at a melting point.
Figure 10:
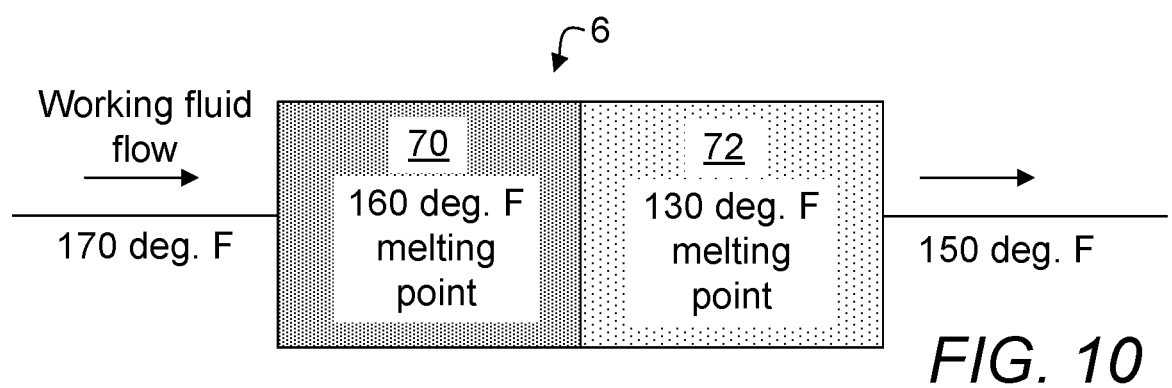
FIG. 10 is a diagram depicting a thermal battery with two PCMs each having a distinct melting point.
Figure 11:
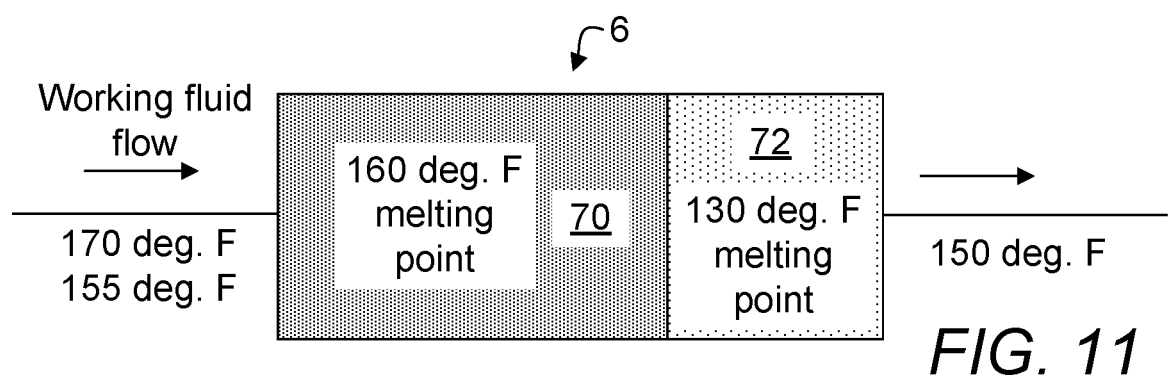
FIG. 11 is a diagram depicting a thermal battery with two PCMs disposed at different thermal storage capacities.
Figure 12:
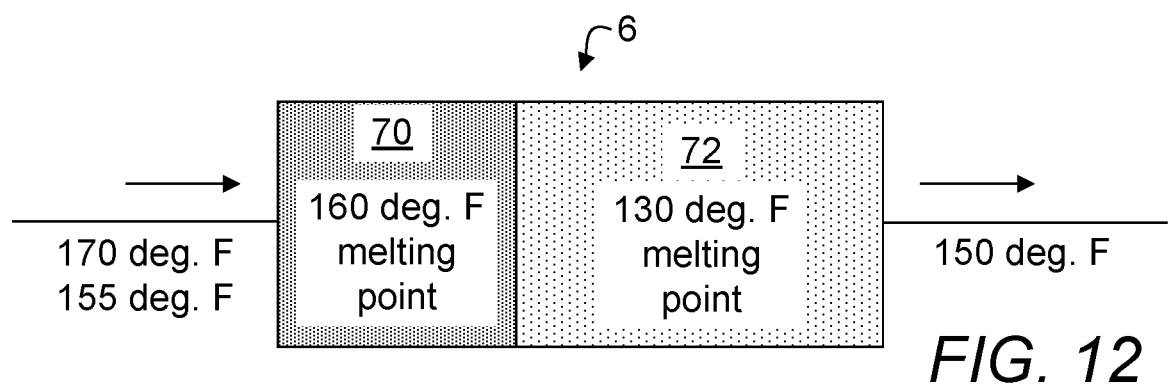
FIG. 12 is a diagram depicting a thermal battery with two PCMs disposed at different thermal storage capacities.

FIG. 9 is a diagram depicting a thermal battery 6 with a single PCM at a melting point. FIG. 10 is a diagram depicting a thermal battery 6 with two PCMs each having a distinct melting point. FIG. 11 is a diagram depicting a thermal battery 6 with two PCMs disposed at different thermal storage capacities. FIG. 12 is a diagram depicting a thermal battery 6 with two PCMs disposed at different thermal storage capacities. Referring to FIG. 9, a working fluid disposed at 170 degrees F. is received at the thermal battery 6 and upon heat transfer, the working fluid exits at 150 degrees F. With the melting point of 160 degrees F. or a temperature that is the same or lower than the temperature of the incoming working fluid, at least a first portion of the PCM 70 experiences a phase change from solid to liquid while at least a second portion of the PCM 70 experiences a temperature increase. The heat transfer that occurs to the first portion is characterized by the latent heat of melting the PCM 70, e.g., 217 kJ/kg multiplied by the mass of the first portion, e.g., 1 kg to yield 217 kJ/kg×1 kg or 217 kJ. The heat transfer that occurs to the second portion is characterized by the specific heat capacity of the PCM 70 solid, e.g., 2.3 kJ/(kg ° C.) multiplied by the mass, e.g., 3 kg, of the second portion that experiences a temperature increase from 150 degrees F. to 170 degrees F. or 20 degrees F. or 11.1111 degrees C. increase in the temperature of the second portion. The heat transfer to the second portion is therefore 2.3 kJ/(kg ° C.)×3 kg×11.1111 degrees C. or about 77 kJ. The total heat transferred and stored in the PCM 70 is then 217 kJ+77 kJ or 294 kJ. Referring to FIG. 10, there are two groups of PCMs, one disposed at the melting point of 160 degrees F. and the other at 130 degrees F. As the melting point of either one of the PCMs 70, 72 is lower than the temperature of the incoming flow at 170 degrees F., both PCMs 70, 72 experience at least some melting. Assume now that 0.8 kg of PCM 70 and 0.8 kg of PCM experience melting and the latent heat of melting for PCM 72 is 2.7 kJ/(kg ° C.), the heat transfer due to phase change of PCM 70 and PCM 72 amounts to 230 kJ/kg×0.8 kg or 180 kJ+217 kJ/kg×0.8 kg or about 358 kJ, an amount that is greater than the total of 294 kJ with the PCM of a single melting point even without considering the heat transfer for increasing the temperature of PCMs 70 and 72. It shall now be apparent that when PCMs of different melting points are used, the PCM with higher melting point shall be disposed upstream of the PCM with lower melting point as temperature must be maintained sufficiently high to cause melting of the PCM with higher melting point to cause a phase change in the PCM with the higher melting point. Therefore, referring back to the arrangement of the sections 40, 42, 44 of FIGS. 1-4, it can be seen that the encapsulated PCMs 34 shall have the highest melting point compared to the encapsulated PCMs 36, 38. Further, it can also be seen that although the thermal battery 6 of FIGS. 11 and 12 is shown to potentially receive a working fluid flow at two different temperatures, i.e., 170 degrees F. and 155 degrees F. at different periods of time, the ratio of the first and second phase change materials can be altered, e.g., by weight and/or volume, to yield the most favorable or highest rate and/or amount of heat storage. It can be seen from FIG. 11 that the amount of PCM 70 is greater than the amount of PCM 72. This may be useful if the amount of time the incoming flow is disposed at 170 degrees F. is higher than the amount of time the incoming flow is disposed at 155 degrees F. Conversely, if the amount of time the incoming flow is disposed at 155 degrees F. is higher than the amount of time the incoming flow is disposed at 170 degrees F., it may be more beneficial to have a thermal battery 6 with more of the PCM 72 than the PCM 70.

Figure 13:
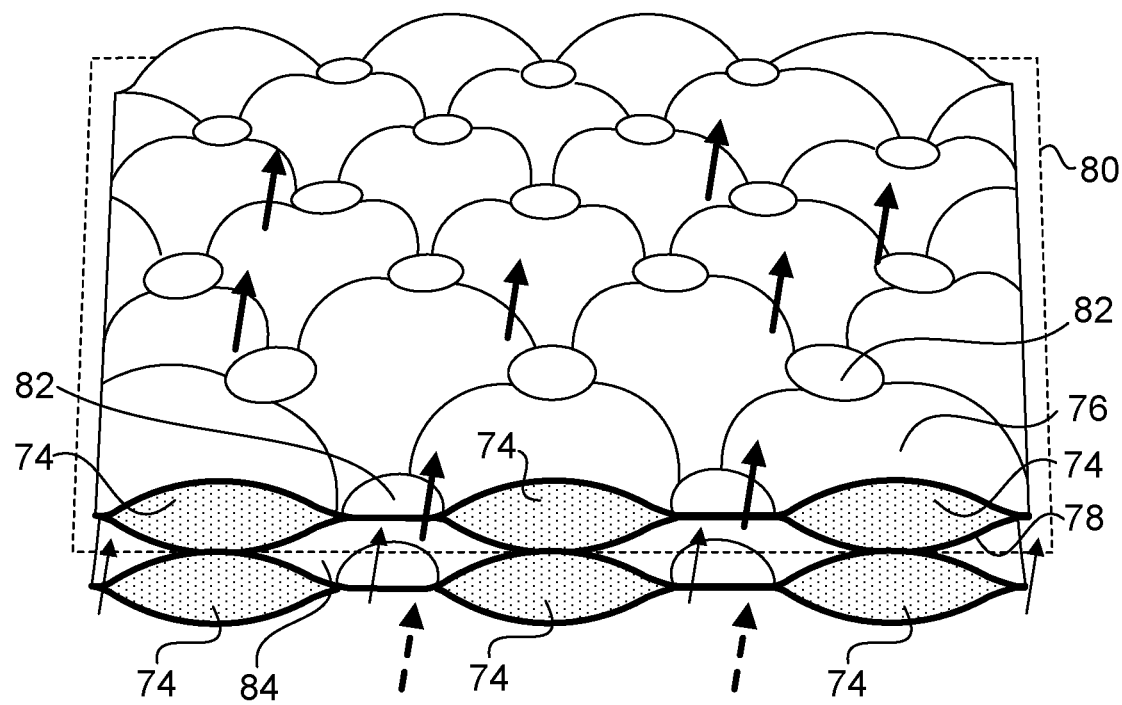
FIG. 13 is a partial top perspective view of two pillow plate heat exchangers disposed in contacting engagement with one another.
Figure 14:
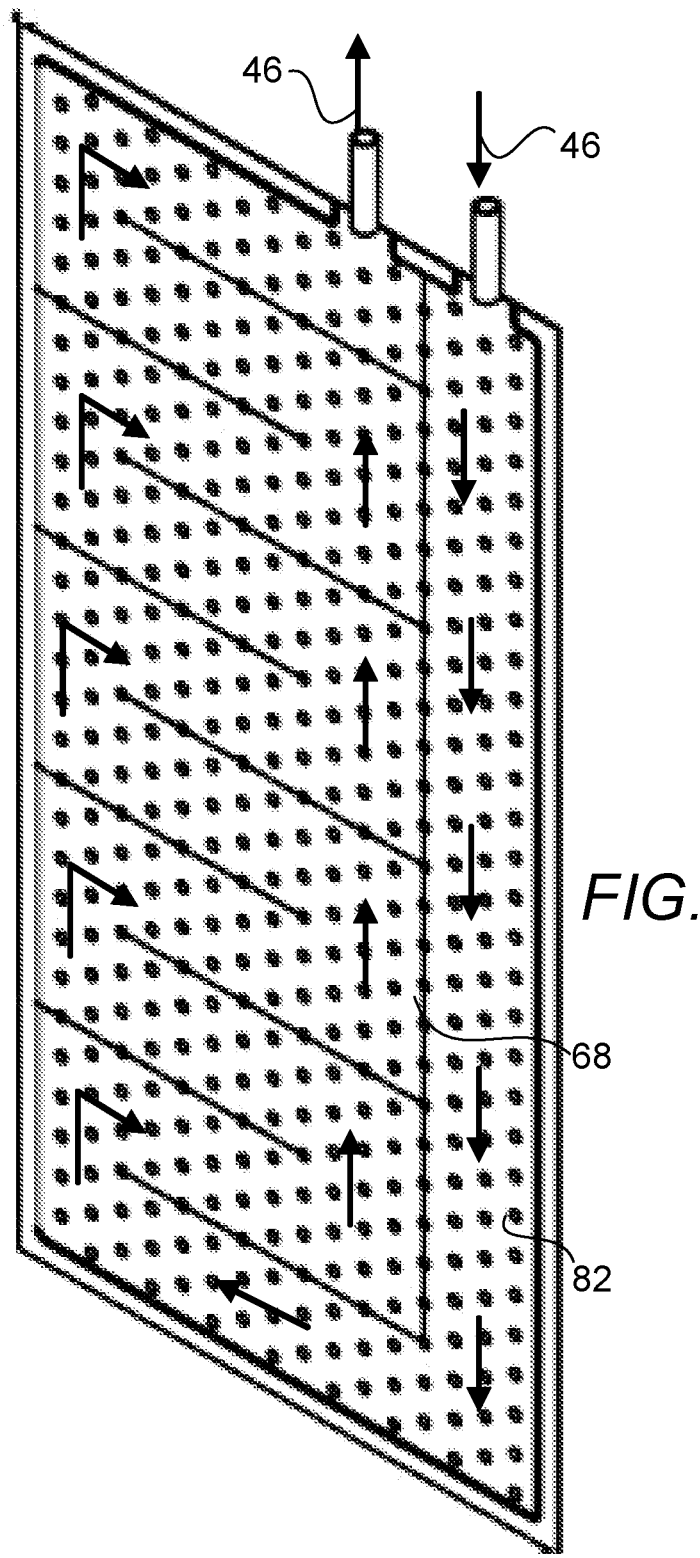
FIG. 14 is an example of a pillow plate heat exchanger.
Figure 15:
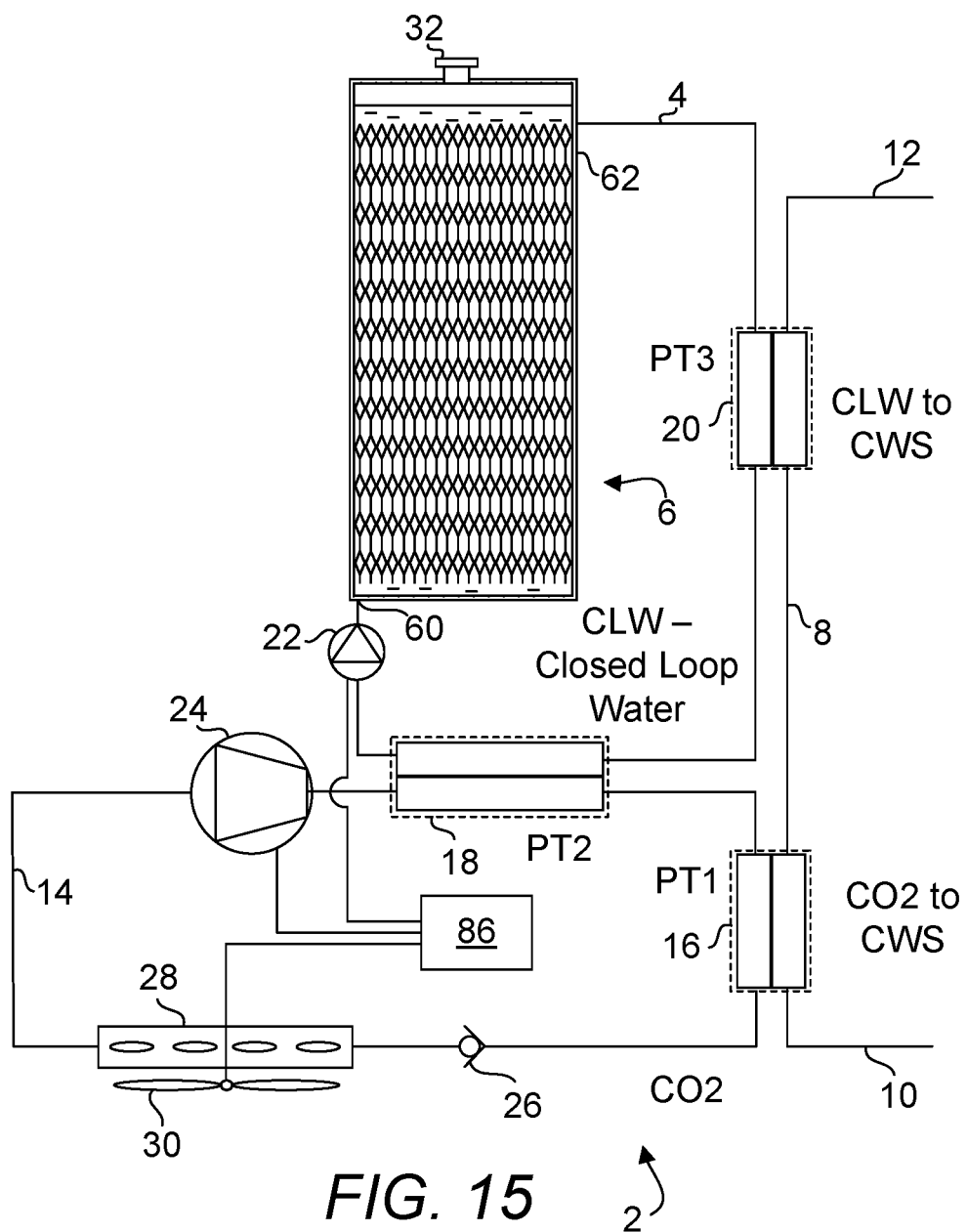
FIG. 15 is a diagram depicting a present heating system where the thermal battery is equipped with pillow plates.

FIG. 13 is a partial top perspective view of two pillow plate heat exchangers disposed in contacting engagement with one another. A pillow plate heat exchanger is generally made of two spaced thin steel sheets, laser-welded to each other at spots 82. The space between plates 76, 78 is pressurized to deform one or both plates 76, 78 in order to provide cavities in which a PCM can be disposed. It is also possible to reverse the roles of the cavities and the space 84 between two pillow plate heat exchangers as long as the medium, e.g., a working fluid, having thermal interaction with the PCM is isolated from the PCM. Here, the cavities are useful for holding a PCM 74. When the two pillow plate heat exchangers are stacked or disposed side-by-side, spaces 84 that are formed between the two heat exchangers can be flow paths for a working fluid as the arrows indicate. It shall be noted that a flow, e.g., of a working fluid, between the two pillow plate heat exchangers is largely disposed a direction parallel to a plane 80 that forms as between the two heat exchangers. Although a present thermal battery 6 has been demonstrated elsewhere herein to contain encapsulated PCMs, the present thermal battery 6 may be formed with pillow plate heat exchangers to yield a thermal battery that is simple in construction and one which is capable of high energy density. FIG. 14 is an example of a pillow plate heat exchanger. Here, a pillow plate heat exchanger is shown with an entry flow of the working fluid 46 via an inlet of the heat exchanger and an exit flow of the working fluid 46 via an outlet of the heat exchanger. The pillow plates forming the heat exchanger have been further modified as seams 68 are welded to form a flow path (for a working fluid or a demanded fluid) through the cavities of the heat exchanger. It is also possible to use PCMs of various melting points in the cavities of the heat exchangers. However, again, each heat exchanger should use a PCM of a single melting point and PCMs of various melting points may be used in multiple heat exchangers and arranged in a manner with descending melting points in the flow direction. FIG. 15 is a diagram depicting a present heating system where the thermal battery 6 is equipped with pillow plates to provide for a high energy density structure.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A heating system for heating a first fluid, said heating system comprising:
    (a) a heat pump;
    (b) a thermal battery loop comprising a thermal battery and a pump configured to circulate a working fluid through said thermal battery, wherein said thermal battery loop is configured to be turned on by turning on said pump;
    (c) a fluid conductor for receiving said first fluid at an inlet at a first temperature and delivering the first fluid at a second temperature;
    (d) a first heat exchanger configured to thermally couple said heat pump and said fluid conductor at a first location of said fluid conductor, wherein said first location of said fluid conductor is disposed between said inlet and said outlet of said fluid conductor;
    (e) a second heat exchanger configured to thermally couple said thermal battery loop and said heat pump; and
    (f) a third heat exchanger configured to thermally couple said thermal battery and said fluid conductor at a second location of said fluid conductor, wherein said second location of said fluid conductor is a location downstream from said first location of said fluid conductor between said inlet and said outlet of said fluid conductor, wherein a thermal charging command causes said heat pump and said thermal battery loop to turn on to cause heat transfer from said heat pump to said thermal battery loop via said second heat exchanger, a heating command causes at least one of said heat pump and said thermal battery loop to turn on to cause heat transfer from at least one of said heat pump via said first heat exchanger and said thermal battery loop via said third heat exchanger to the first fluid of said fluid conductor and a simultaneous thermal charging and heating command causes said heat pump and said thermal battery loop to turn on.

2. The heating system of claim 1, wherein said thermal battery comprises more than one heat storage capsule each comprising a phase change material.

3. The heating system of claim 2, wherein said more than one heat storage capsule comprise phase change materials of more than one melting point.

4. The heating system of claim 1, wherein said thermal battery comprises more than one compartment each compartment configured to hold a heat storage material of a distinct melting point.

5. The heating system of claim 1, wherein said thermal battery comprises a pillow plate heat exchanger.

6. The heating system of claim 1, wherein said thermal battery comprises phase change materials of least two distinct melting points.

7. The heating system of claim 6, wherein said thermal battery comprises a first phase change material of a first melting point and a second phase change material of a second melting point, wherein said first melting point is not the same as the second melting point and a ratio of said first phase change material to said second phase change material is not 1.0 by a quantity selected from the group consisting of volume, weight and a combination thereof.

8. The heating system of claim 1, wherein at least one of said first heat exchanger, second heat exchanger and third heat exchanger is a plate-type heat exchanger.

9. A heating system for heating a first fluid, said heating system comprising:
    (a) a heat pump;
    (b) a thermal battery loop comprising a thermal battery and a pump configured to circulate a working fluid through said thermal battery, wherein said thermal battery loop is configured to be turned on by turning on said pump and said thermal battery comprises phase change materials of least two distinct melting points;
    (c) a fluid conductor for receiving said first fluid at an inlet at a first temperature and delivering the first fluid at a second temperature;
    (d) a first heat exchanger configured to thermally couple said heat pump and said fluid conductor at a first location of said fluid conductor, wherein said first location of said fluid conductor is disposed between said inlet and said outlet of said fluid conductor;

(e) a second heat exchanger configured to thermally couple said thermal battery loop and said heat pump; and (f) a third heat exchanger configured to thermally couple said thermal battery and said fluid conductor at a second location of said fluid conductor, wherein said second location of said fluid conductor is a location downstream from said first location of said fluid conductor between said inlet and said outlet of said fluid conductor, wherein a thermal charging command causes said heat pump and said thermal battery loop to turn on to cause heat transfer from said heat pump to said thermal battery loop via said second heat exchanger, a heating command causes at least one of said heat pump and said thermal battery loop to turn on to cause heat transfer from at least one of said heat pump via said first heat exchanger and said thermal battery loop via said third heat exchanger to the first fluid of said fluid conductor and a simultaneous thermal charging and heating command causes said heat pump and said thermal battery loop to turn on.

10. The heating system of claim 9, wherein said thermal battery comprises more than one heat storage capsule each comprising a phase change material.

11. The heating system of claim 10, wherein said more than one heat storage capsule comprise phase change materials of more than one melting point.

12. The heating system of claim 9, wherein said thermal battery comprises more than one compartment each compartment configured to hold a heat storage material of a distinct melting point.

13. The heating system of claim 9, wherein said thermal battery comprises a pillow plate heat exchanger.

14. The heating system of claim 9, wherein said thermal battery comprises a first phase change material of a first melting point and a second phase change material of a second melting point, wherein said first melting point is not the same as the second melting point and a ratio of said first phase change material to said second phase change material is not 1.0 by a quantity selected from the group consisting of volume, weight and a combination thereof.

15. The heating system of claim 9, wherein at least one of said first heat exchanger, second heat exchanger and third heat exchanger is a plate-type heat exchanger.

16. A heating system for heating a first fluid, said heating system comprising:

(a) a heat pump;

(b) a thermal battery loop comprising a thermal battery and a pump configured to circulate a working fluid through said thermal battery, wherein said thermal battery loop is configured to be turned on by turning on said pump and said thermal battery comprises more than one heat storage capsule each comprising a phase change material;

(c) a fluid conductor for receiving said first fluid at an inlet at a first temperature and delivering the first fluid at a second temperature;

(d) a first heat exchanger configured to thermally couple said heat pump and said fluid conductor at a first location of said fluid conductor, wherein said first location of said fluid conductor is disposed between said inlet and said outlet of said fluid conductor;

(e) a second heat exchanger configured to thermally couple said thermal battery loop and said heat pump; and (f) a third heat exchanger configured to thermally couple said thermal battery and said fluid conductor at a second location of said fluid conductor, wherein said second location of said fluid conductor is a location downstream from said first location of said fluid conductor between said inlet and said outlet of said fluid conductor, wherein a thermal charging command causes said heat pump and said thermal battery loop to turn on to cause heat transfer from said heat pump to said thermal battery loop via said second heat exchanger, a heating command causes at least one of said heat pump and said thermal battery loop to turn on to cause heat transfer from at least one of said heat pump via said first heat exchanger and said thermal battery loop via said third heat exchanger to the first fluid of said fluid conductor and a simultaneous thermal charging and heating command causes said heat pump and said thermal battery loop to turn on.

17. The heating system of claim 16, wherein said more than one heat storage capsule comprise phase change materials of more than one melting point.

18. The heating system of claim 16, wherein said thermal battery comprises more than one compartment each compartment configured to hold a heat storage material of a distinct melting point.

19. The heating system of claim 16, wherein said thermal battery comprises phase change materials of at least two distinct melting points.

20. The heating system of claim 19, wherein said thermal battery comprises a first phase change material of a first melting point and a second phase change material of a second melting point, wherein said first melting point is not the same as the second melting point and a ratio of said first phase change material to said second phase change material is not 1.0 by a quantity selected from the group consisting of volume, weight and a combination thereof.

* * * * *